US006121531A

United States Patent [19]

Kato

[11] Patent Number: 6,121,531

[45] Date of Patent: Sep. 19, 2000

[54] KARAOKE APPARATUS SELECTIVELY PROVIDING HARMONY VOICE TO DUET SINGING VOICES

[75] Inventor: Hirokazu Kato, Hamamatsu, Japan

[73] Assignee: Yamaha Corporation, Hamamatsu, Japan

[21] Appl. No.: 08/904,403

[22] Filed: Jul. 31, 1997

[30] Foreign Application Priority Data

Aug. 9, 1996 [JP] Japan .................................... 8-211646

[51] Int. Cl.[7] ............................... G09B 5/00; G10H 1/08; G10H 1/36

[52] U.S. Cl. ................................ 84/610; 84/625; 84/626; 434/307 A

[58] Field of Search ..................... 84/609–614, 625–638, 84/DIG. 4; 434/307 A

[56] References Cited

U.S. PATENT DOCUMENTS

| | | | |
|---|---|---|---|
| 5,542,000 | 7/1996 | Semba | 434/307 A |
| 5,712,437 | 1/1998 | Kageyama | 84/610 |
| 5,739,452 | 4/1998 | Nagata | 84/610 |
| 5,753,845 | 5/1998 | Nagata et al. | 84/626 |
| 5,770,813 | 6/1998 | Nakamura | 84/610 |
| 5,773,743 | 6/1998 | Ogawa et al. | 84/610 |
| 5,773,744 | 6/1998 | Nagata | 84/610 |
| 5,811,707 | 9/1998 | Kakehashi et al. | 84/610 |
| 5,902,950 | 5/1999 | Kato et al. | 84/610 |

*Primary Examiner*—Stanley J. Witkowski
*Attorney, Agent, or Firm*—Pillsbury Madison & Sutro LLP

[57] ABSTRACT

A karaoke apparatus accompanies a vocal performance with a karaoke accompaniment reproduced according to karaoke data. In the karaoke apparatus, an input device separately converts a plurality of singing voices vocalized by different singers into respective ones of initial voice signals. At least one pitch sifter is utilized to shift a pitch of the initial voice signal to create a modified voice signal representative of a harmony voice made consonant to the singing voice. A distributor operates according to control information contained in the karaoke data to selectively distribute at least one of the initial voice signals to the pitch sifter so as to create the modified voice signal corresponding to the distributed initial voice signal. An output device selectively mixes the initial voice signals and the modified voice signal to reproduce the vocal performance composed of selected ones of the singing voices and the harmony voice in synchronization with the karaoke accompaniment.

26 Claims, 3 Drawing Sheets

KARAOKE APPARATUS SELECTIVELY PROVIDING HARMONY VOICE TO DUET SINGING VOICES

BACKGROUND OF THE INVENTION

1. Field of the Invention

The present invention generally relates to a karaoke apparatus having a capability of attaching a harmony voice to a singing voice inputted through a microphone.

2. Description of Related Art

A karaoke apparatus is constructed such that a singing voice picked up by a microphone is mixed with an orchestral sound reproduced from a music source in accompaniment with the singing voice, and the mixed result is outputted from a loudspeaker.

Recently, karaoke apparatuses having a capability of giving a harmonic effect to a singing voice have been developed. In a karaoke apparatus of this type, pitch shift through the process of turning up or down a scale is performed on a singing voice inputted through a microphone so that a harmony voice made consonant to the singing voice is generated. The harmony voice is added to the original singing voice and a resultant composite sound is released from a loudspeaker together with karaoke accompaniment.

In the above-mentioned conventional karaoke apparatuses, if two units of microphones are used to collect duet singing voices, corresponding analog signals provided by these microphones are mixed together. The mixed signal is pitch-shifted to generate a harmony voice signal. Consequently, even if a desired harmony voice is intended to be added to only one of the duet singing voices inputted from one microphone, a parallel harmony voice is also added to the other singing voice inputted from the other microphone, thereby failing to attach different harmony voices to different singing voices.

The above-mentioned conventional harmonic effect generating capability thus lacks flexibility, and discourages karaoke players who wish to enjoy harmonic effects. For example, one solo singer may wish to be backed by five chorus parts. In such a case, if harmony voices of four virtual singers were attached to an actual singing voice inputted from another of the two microphones, one of the two real singers could perform solo vocal and the other real singer could perform a back-chorus of five parts for backing the solo vocal. The back-chorus could be composed of four virtual parts synthetically generated by the harmonic effect generating capability and one real part voiced by the other singer. However, as discussed the conventional karaoke apparatus derives the harmony voice from the composite voice signal obtained by mixing the singing voices inputted through the multiple microphones, thereby failing to provide variable backing chorus modes such as those mentioned above. In another example a back-chorus might be given to only one of the duet singers during progression of karaoke music in a duet performance. To realize such a chorus mode by utilizing the harmonic effect generating capability of a karaoke apparatus, a harmony voice must be independently attached to the singing voices captured from the microphones at a desired timing. However, any of the conventional karaoke apparatuses cannot satisfy such a requirement.

SUMMARY OF THE INVENTION

It is therefore an object of the present invention to provide a karaoke apparatus capable of attaching a plurality of harmony voices independently at a desired timing to a plurality of singing voices inputted through a plurality of microphones, and additionally capable of giving effects such as echo to selected ones of the singing voices and the chorus voices.

According to an embodiment of the invention, a karaoke apparatus accompanies a vocal performance with a karaoke accompaniment reproduced according to karaoke data. The karaoke apparatus comprises an input device that separately converts a plurality of singing voices vocalized by different singers into respective ones of initial voice signals, at least one pitch sifter that is utilized to shifter a pitch of the initial voice signal to create a modified voice signal representative of a harmony voice made consonant to the singing voice, a distributor that operates according to control information contained in the karaoke data to selectively distribute at least one of the initial voice signals to the pitch shifter so as to create the modified voice signal corresponding to the distributed initial voice signal, and an output device that selectively mixes the initial voice signals and the modified voice signal to reproduce the vocal performance composed of selected ones of the singing voices and the harmony voice in synchronization with the karaoke accompaniment.

Specifically, the distributor comprises a memory that memorizes the karaoke data containing the control information arranged according to progression of the karaoke accompaniment, a sequencer that sequentially retrieves the control information from the memory in synchronization with progression of the karaoke accompaniment, and a selector that operates according to the retrieved control information to selectively distribute the initial voice signals to the pitch shifter in matching with the progression of the karaoke accompaniment.

In one embodiment, the distributor distributes one initial voice signal to one pitch shifter and distributes another initial voice signal to another pitch shifter so that the singing voices of the different singers are treated independently from each other to create harmony voices separately made consonant to corresponding ones of the singing voices. In another embodiment, the distributor distributes only one of the initial voice signals to a plurality of pitch shifter so as to create a plurality of harmony voices variably made consonant to one of the singing voices while other singing voice is made free of harmony voices.

In one embodiment, the karaoke apparatus further comprises at least one effector that is utilized to impart an acoustic effect to the initial voice signals and the modified voice signal. In such a case, the distributor operates according to the control information to selectively distribute at least one of the initial voice signals and the modified voice signal to the effector. Preferably, the distributor distributes the initial voice signal to the effector in such a way that the singing voice is reproduced with the acoustic effect while the harmony voice is reproduced without any acoustic effect.

DETAILED DESCRIPTION OF PREFERRED EMBODIMENTS

This invention will be described in further detail by way of one preferred embodiment of a karaoke apparatus according to the invention, with reference to the accompanying drawings. While the preferred embodiment of the invention will be described using specific terms, such description is for illustrative purposes only, and it is to be understood that changes and variations may be made without departing from the spirit or scope of the appended claims.

Figure 1:
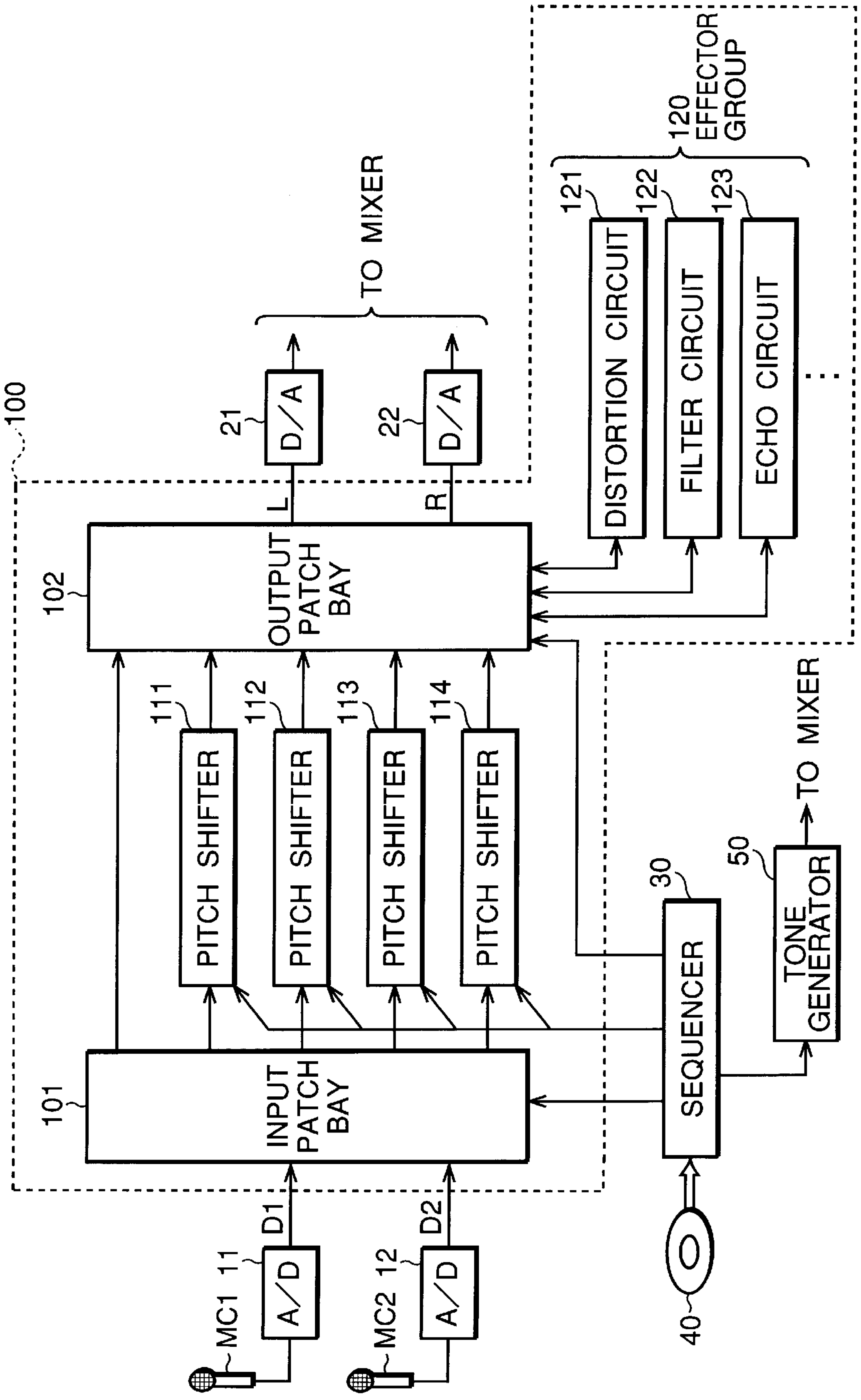
FIG. 1 is a block diagram illustrating a construction of a karaoke apparatus according to a preferred embodiment of the invention.

Now, referring to FIG. 1, there is shown a block diagram illustrating a karaoke apparatus according to a preferred embodiment of the invention. The karaoke apparatus is equipped with an effect section 100. In the embodiment, a singing voice is picked up or collected by two units of microphones MC1 and MC2. Corresponding analog voice signals outputted from the microphones MC1 and MC2 are converted by an A/D converter 11 and an A/D converter 12 into digital voice signals called a dry voice signal D1 and a dry voice signal D2. These dry or initial voice signals are supplied to the effect section 100. The effect section 100 is constructed for imparting a variety of effects to the dry voice signals D1 and D2. The effect section 100 comprises an input patch bay 101, an output patch bay 102, four pitch shifters 111 through 114, and an effector group 120 made up of a distortion circuit 121, a filter circuit 122, and an echo circuit 123.

The operation of the components of the effect section 100 is controlled by a sequencer 30 in synchronization with progression of karaoke music. Generally, the sequencer 30 sequentially reproduces performance information for automatic performance of karaoke music from karaoke data recorded in a machine readable media 40. The sequencer 30 sequentially supplies the reproduced performance information to a tone generator 50, which generates instrumental sound of karaoke accompaniment. In the preferred embodiment, control information for controlling the operation of the components of the effect section 100 is stored in the storage media 40 along with the performance information. The media 40 may be, for example, a floppy disk or compact disk. The stored data is sequentially read by the sequencer 30 along with the performance information. The read information are supplied to the components of the effect section 100.

The pitch shifters 111 through 114 generate a harmony voice signal from the dry voice signal D1 or the dry voice signal D2. The control information reproduced by the sequencer 30 includes information for generating this harmony voice signal. This information includes of identification information for identifying one of the pitch shifters 111 through 114 for generating the harmony voice signal and pitch designating information for designating a pitch of the harmony voice signal to be generated by the pitch shifter. The sequencer 30 sets the pitch designating information included in the control information to the pitch shifter identified by the identification information. The pitch shifter to which the pitch designating information has been set shifts the pitch of the dry voice signal to match with the pitch designed by the pitch designating information, thereby generating the harmony voice signal which is a modified form of the initial voice signal.

Further, selectively using the pitch shifters 111 through 114, the effect section 100 attaches the harmony voice signals to the dry voice signals D1 and D2 independently from each other. To be more specific, in the preferred embodiment, the pitch shifters 111 through 114 are independently assigned to the dry voice signals D1 and D2 to provide various chorus backing modes. For example, in one mode, a harmony voice signal is attached to only one of the dry voice signals D1 and D2 at one time. In another mode, a different number of harmony voice signals are attached to each dry voice signal at another time.

The input patch bay 101 is utilized to selectively generate a harmony voice signal for each of these dry voice signals. To be more specific, the input patch bay 101 distributes the dry voice signals D1 and D2 to the pitch shifters 111 through 114 independently from each other, and also supplies the dry voice signals D1 and D2 directly to the output patch bay 102. The control information read by the sequencer 30 includes an input control signal for designating a manner by which the dry voice signals D1 and D2 are selectively distributed to the pitch shifters 111 through 114. When this input control signal is read by the sequencer 30, the input patch bay 101 controls the distribution of the dry voice signals D1 and D2 in accordance with the input control signal.

The output patch bay 102 not only receives the dry or initial voice signals directly from the input patch bay 101, but also receives the harmony voice signals from the pitch shifters 111 through 114. The output patch bay 102 synthesizes these initial and modified voice signals, and outputs stereophonic voice signals L and R of a stereo composed of left and right channels. Through a mixer, the stereophonic voice signals L and R are mixed by with a music signal of karaoke melody sound and karaoke accompaniment sound provided from the tone generator 50. The mixed signals are outputted from left and right speakers of the stereo. Sometimes, an output control signal is read by the sequencer 30 as a part of the control information. This output control signal specifies an effector to which selected ones of the dry voice signals from the microphones and the harmony voice signals from the pitch shifters are sent for imparting a desired effect. When the effect section 100 detects output control signal from the sequencer 30, the output patch bay 102 sends selected ones of the initial dry voice signals and the modified harmony voice signals to selected ones of the effectors 121, 122 and 123. The selected ones of the voice signals and the selected ones of the effectors in the effector group 120 are both designated by the output control signal. Using the output voice signals of the selected effectors, the stereophonic voice signals of these output voice signals are synthesized in the similar manner as the above-mentioned stereophonic voice signal in the output batch bay 102.

The digital voice signals of left and right channels obtained from the output patch bay 102 are converted, by the D/A converters 21 and 22, into analog voice signals to be sent to the mixer. The mixer adds the analog music signals of the karaoke melody sound and karaoke accompaniment sound supplied from the tone generator 50 to the analog voice signals of left and right channels, and outputs a resultant composite sound from the left and right speakers.

According to the preferred embodiment, the pitch shifters 111 through 114 can be assigned without binding to each of the dry voice signals D1 and D2 according to the input control signal from the sequencer 30. Consequently, harmony voices can be separately reproduced from the singing voices inputted from the microphones MC1 and MC2. In addition, chorus backing modes by which these harmony voices are generated can be switched as the karaoke music progresses. The following describes such operations of the preferred embodiment with reference to particular examples.

Figure 2:
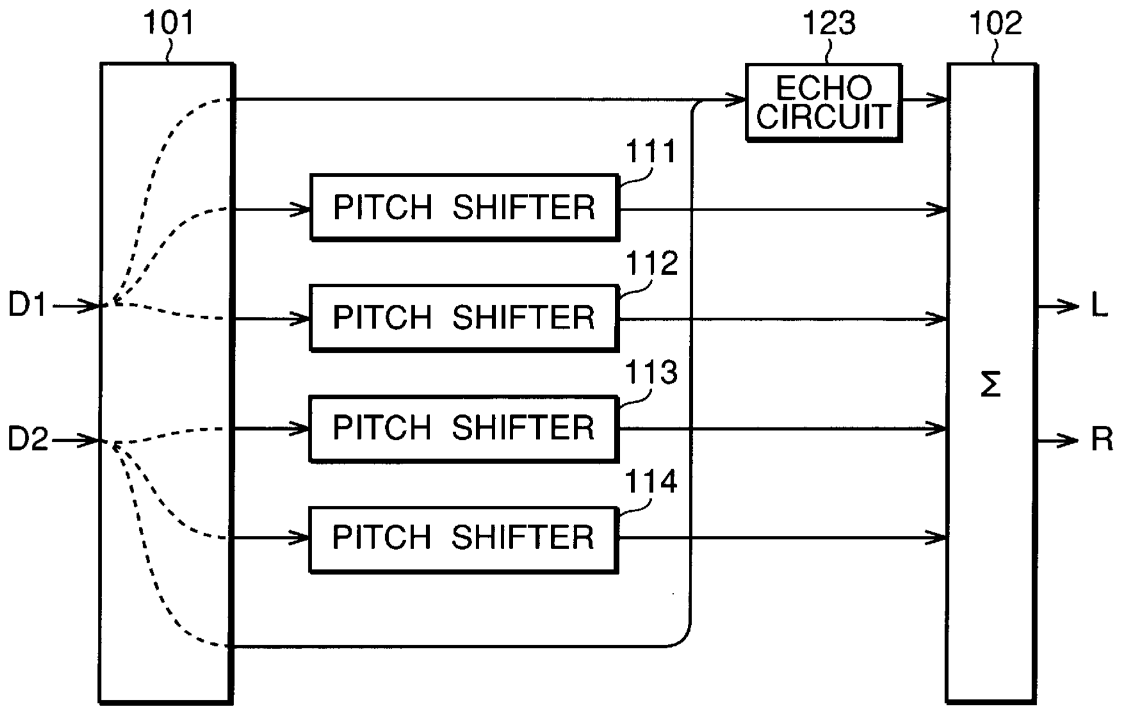
FIG. 2 is a diagram illustrating a first example of the operation of the preferred embodiment of FIG. 1.

First, in an example shown in FIG. 2, the dry voice signal D1 is supplied from the input patch bay 101 to the pitch shifters 111 and 112, and the other dry voice signal D2 is supplied to the pitch shifters 113 and 114. By means of the output patch bay 102, the dry voice signals D1 and D2 are supplied to the echo circuit 123. From the output signal of the echo circuit 123 and the output signals of the pitch shifters 111 through 114, voice signals L and R are synthesized. In this example, if an echo effect were imparted to the output signals of the pitch shifters (these output signals are hereafter referred to as "wet voice signals"), the resulting sound would be unnatural. In order to avoid such an unnatural sound, the echo effect processing is performed only on the dry voice signal and not the wet voice signal. In this example, when a pair of singers having the microphones MC1 and MC2 respectively sing a duet number, a back-chorus of two parts can be attached to each of the singing voices.

Figure 3:
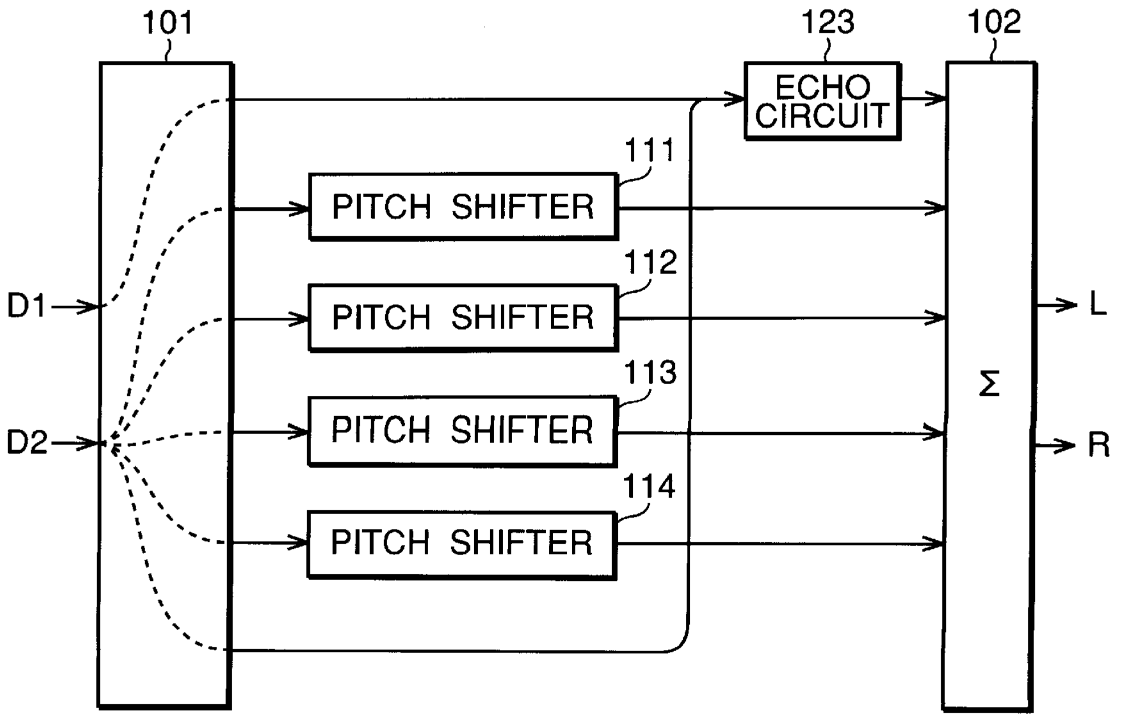
FIG. 3 is a diagram illustrating a second example of the operation of the preferred embodiment of FIG. 1.

Next, in an example shown in FIG. 3, the dry voice signal D2 is supplied by the input patch bay 101 to the pitch shifters 111 through 114. At the same time, the dry voice signals D1 and D2 are supplied by the output patch bay 102 to the echo circuit 123. From the output signal of the echo circuit 123 and the output signals of the pitch shifters 111 through 114, the voice signals L and R are synthesized. Therefore, in this example, the singer having the microphone MC1 can sing solo, while the other singer having the microphone MC2 can sing a back-chorus of five parts. One of the five parts is the dry voice or the initial singing voice while the other four parts are the wet voices or the modified harmony voices.

The input control information and the output control information corresponding to the various modes as shown in FIGS. 2 and 3 are stored along with the performance information in the machine readable storage media 40 in advance as karaoke data. When karaoke performance starts, these information items of the karaoke data are sequentially read as the karaoke music progresses. At one particular time, the mode shown in FIG. 2 is set and, at another particular time, the mode shown in FIG. 3 is set by switching the connection states of the pitch shifters 111 through 114 in the effect section 100. This setup permits a backing chorus mode in which, at the beginning section of the karaoke music, a back-chorus of two parts is attached to each of the singing voices of the singers having the microphones MC1 and MC2, and, at a later section of the karaoke music the singer having the microphone MC1 sings solo, while the other singer having the microphone MC2 performs a back-chorus of five parts in total, by way of example.

Figure 4:
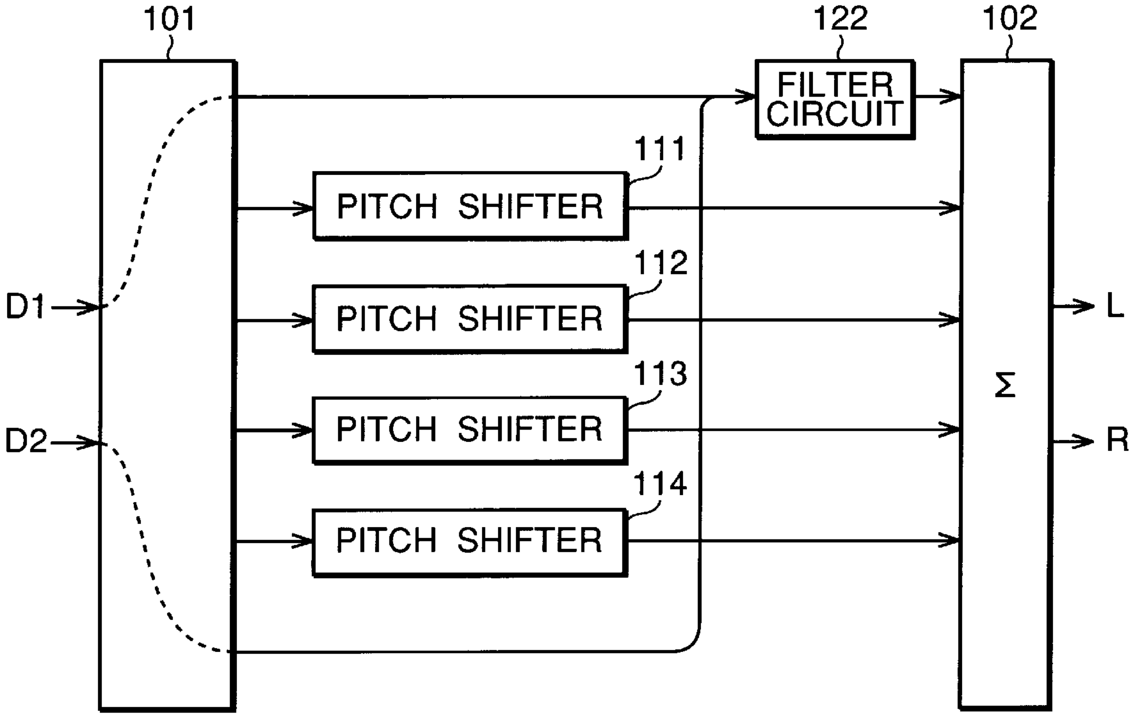
FIG. 4 is a diagram illustrating a third example of the operation of the preferred embodiment of FIG. 1.

Described above is the operation for switching the assignment of the dry voice signals to the pitch shifters in a time sequence. In the preferred embodiment, a special effect can be created using only the dry voice signals. FIG. 4 shows an example of this special effect. In this example, the pitch shifters 111 through 114 are not used; only the dry voice signals D1 and D2 are supplied by the output patch bay 102 to the filter circuit 122. From the output signal of the filter circuit 122, the voice signals L and R are synthesized. The filter circuit 122 has filtering characteristics or frequency response simulating, for example, a submarine-type speaking tube. Therefore, in the example shown in FIG. 4, when the singers having the microphones MC1 and MC2 utter phrases or lyrics, a voice is released from the speakers as if it has passed through the submarine-type speaking tube. The input control information and the output control information corresponding to the example of FIG. 4 are stored in the storage media 40 in advance. The two kind of control information are retrieved by the sequencer 30 in an interval between sections of the karaoke music, for example. This setup allows the singers to enjoy a special effect in which the voice of the singers inputted into the microphones is outputted from the speakers as if the voice has passed through the submarine-type speaking tube. In the above-mentioned preferred embodiment, the karaoke apparatus having two units of microphones are used for description purpose. It will be apparent to those skilled in the art that the invention is also applicable to a karaoke apparatus having three or more microphones.

Referring back to FIG. 1, the inventive karaoke apparatus accompanies a vocal performance with a karaoke accompaniment reproduced according to karaoke data. In the karaoke apparatus, an input device, in the form of the microphones MC1 and MC2, separately converts a plurality of singing voices vocalized by different singers into respective ones of initial voice signals D1 and D2. At least one of pitch shifters 111 through 114 is utilized to shift a pitch of the initial voice signal D1 or D2 to create a modified voice signal representative of a harmony voice made consonant to the singing voice. A distributor operates according to control information contained in the karaoke data to selectively distribute at least one of the initial voice signals D1 and D2 to the pitch shifter 111, 112, 113 or 114 so as to create the modified voice signal corresponding to the distributed initial voice signal D1 or D2. An output device including the output patch bay 102 selectively mixes the initial voice signals D1 and D2 and the modified voice signal to reproduce the vocal performance composed of selected ones of the singing voices and the harmony voice in synchronization with the karaoke accompaniment.

Specifically, the distributor comprises a memory in the form of the media 40 that memorizes the karaoke data containing the control information arranged according to progression of the karaoke accompaniment, a sequencer 30 that sequentially retrieves the control information from the memory in synchronization with progression of the karaoke accompaniment, and a selector in the form of the input patch bay 101 that operates according to the retrieved control information to selectively distribute the initial voice signals D1 and D2 to the pitch shifters in matching with the progression of the karaoke accompaniment.

In operation, as shown in FIG. 2, the distributor distributes one initial voice signal D1 to one pitch shifter and distributes another initial voice signal D2 to another pitch shifter so that the singing voices of the different singers are treated independently from each other to create harmony voices separately made consonant to corresponding ones of the singing voices. Otherwise, as shown in FIG. 3, the distributor distributes only one of the initial voice signals D1 and D2 to a plurality of pitch shifters 111 through 114 so as to create a plurality of harmony voices variably made consonant to one of the singing voices while another singing voice is made free of harmony voices.

Additionally, the karaoke apparatus further comprises at least one effector 121, 122 or 123 that is utilized to impart an acoustic effect to the initial voice signals and the modified voice signal. In such a case, the distributor operates according to the control information to selectively distribute at least one of the initial voice signals and the modified voice signal to the effector. Preferably, as shown in FIG. 2, the distributor distributes the initial voice signal to the effector so that the singing voice is reproduced with the acoustic effect while the harmony voice is reproduced without any acoustic effect.

The machine readable media 40 contains instructions for causing a karaoke machine accompanying a vocal performance with a karaoke accompaniment to be reproduced according to karaoke data to perform chorus operation. The chorus operation comprises the steps of separately converting a plurality of singing voices vocalized by different singers into respective ones of initial voice signals D1 and D2, activating at least one pitch shifter 111, 112, 113 or 114 which is utilized to shift a pitch of the initial voice signal so as to create a modified voice signal representative of a harmony voice made consonant to the singing voice, selectively distributing at least one of the initial voice signals D1 and D2 to the pitch shifter according to control information contained in the karaoke data so as to create the modified voice signal corresponding to the distributed initial voice signal, and selectively mixing the initial voice signals and the modified voice signal so as to reproduce the vocal performance composed of selected ones of the singing voices and the harmony voice in synchronization with the karaoke accompaniment. In one embodiment, the step of selectively distributing comprises memorizing the karaoke data containing the control information arranged according to progression of the karaoke accompaniment in a memory, sequentially retrieving the control information from the memory in synchronization with progression of the karaoke accompaniment, and selectively distributing the initial voice signals to the pitch shifter according to the retrieved control information in matching with the progression of the karaoke accompaniment. In one embodiment, the step of selectively distributing comprises distributing one initial voice signal to one pitch shifter and distributing another initial voice signal to another pitch shifter so that the singing voices of the different singers are treated independently from each other to create harmony voices that are separately made consonant to corresponding ones of the singing voices.

As described above and according to the invention, a harmony voice is attached separately to singing voices, and effect processing such as echo is performed independently on the harmony and singing voices, thereby providing a variety of vocal processing operations for more enjoyment of karaoke performance.

What is claimed is:

1. A karaoke apparatus for accompanying a vocal performance with a karaoke accompaniment reproduced according to karaoke data, comprising:

an input device that separately converts a plurality of singing voices vocalized by different singers into respective ones of initial voice signals;

a plurality of pitch shifters, each pitch shifter being utilized to shift a pitch of the initial voice signal to create a modified voice signal representative of a harmony voice made consonant to the singing voice corresponding to the initial voice signal;

a distributor that operates according to control information contained in the karaoke data to selectively distribute the initial voice signals to the pitch shifters so as to create the modified voice signals corresponding to the distributed initial voice signals, wherein the distributor selectively distributes one initial voice signal to one group of pitch shifters and distributes other initial voice signals to other groups of pitch shifters, respectively, so that the singing voices of different singers are treated independently from each other; and an output device that selectively mixes the initial voice signals and the modified voice signals to reproduce the vocal performance composed of selected ones of the singing voices and the harmony voices in synchronization with the karaoke accompaniment.

2. A karaoke apparatus according to claim 1, wherein the distributor comprises a memory that memorizes the karaoke data containing the control information arranged according to progression of the karaoke accompaniment, a sequencer that sequentially retrieves the control information from the memory in synchronization with progression of the karaoke accompaniment, and a selector that operates according to the retrieved control information to selectively distribute the initial voice signals to the pitch shifter in matching with the progression of the karaoke accompaniment.

3. A karaoke apparatus according to claim 1, wherein the distributor distributes one initial voice signal to one pitch shifter and distributes another initial voice signal to another pitch shifter so that the singing voices of different singers are treated independently from each other to create harmony voices that are separately made consonant to corresponding ones of the singing voices.

4. A karaoke apparatus according to claim 1, further comprising at least one effector that is utilized to impart an acoustic effect to the initial voice signals and the modified voice signal, and wherein the distributor operates according to the control information to selectively distribute at least one of the initial voice signals and the modified voice signal to the effector.

5. A karaoke apparatus according to claim 4, wherein the distributor distributes the initial voice signal to the effector so that the singing voice is reproduced with the acoustic effect while the harmony voice is reproduced without any acoustic effect.

6. A karaoke apparatus for accompanying a singing voice with a karaoke accompaniment reproduced according to karaoke data, comprising:

an input device that converts a singing voice vocalized by a singer into an initial voice signal;

an effector that is utilized to create a first modified voice signal so as to impart an acoustic effect to the singing voice;

a memory that memorizes the karaoke data containing control information arranged to designate a part of the singing voice to be imparted with the acoustic effect along with progression of the karaoke accompaniment;

a sequencer that sequentially retrieves the control information from the memory in synchronization with the progression of the karaoke accompaniment;

a selector that operates according to the retrieved control information to selectively distribute the part of the initial voice signal designated by the control information to the effector in matching with the progression of the karaoke accompaniment;

at least one pitch shifter that is utilized to shift a pitch of the initial voice to create a second modified voice signal representative of a harmony voice that is made consonant to the singing voice;

a distributor that distribute the other part of the initial voice signal, which is not imparted with the acoustic effect, to the pitch shifter so as to create the second modified voice signal corresponding to the distributed other part of the initial voice signal; and an output device that receives the first modified voice signal from the effector and the second modified voice signal from the pitch shifter to reproduce the singing voice that is partly imparted with the acoustic effect and partly imparted with the harmony effect together with the karaoke accompaniment.

7. A karaoke apparatus for accompanying a vocal performance with a karaoke accompaniment reproduced according to karaoke data, comprising:

a plurality of microphones for separately converting a plurality of singing voices vocalized by different singers into respective ones of initial voice signals;

a plurality of shifting means for shifting a pitch of the initial voice signals to create modified voice signals representative of a harmony voice made consonant to the singing voices corresponding to the shifted initial voice signals;

distributing means operative according to control information contained in the karaoke data to selectively distribute the initial voice signals to the shifting means so as to create the modified voice signals corresponding to the distributed initial voice signals, wherein the distributing means selectively distributes one initial voice signal to one group of shifting means and distributes other initial voice signals to other groups of shifting means, respectively, so that the singing voices of the different singers are treated independently from each other; and a mixer for selectively mixing the initial voice signals and the modified voice signals so as to reproduce the vocal performance composed of selected ones of the singing voices and the harmony voices in synchronization with the karaoke accompaniment.

8. A karaoke apparatus according to claim 7, wherein the distributing means comprises memory means for memorizing the karaoke data containing the control information arranged according to progression of the karaoke accompaniment, sequencer means for sequentially retrieving the control information from the memory means in synchronization with progression of the karaoke accompaniment, and selecting means operative according to the retrieved control information to selectively distribute the initial voice signals to the shifting means in matching with the progression of the karaoke accompaniment.

9. A karaoke apparatus according to claim 7, further comprising effector means utilized for imparting an acoustic effect to the initial voice signals and the modified voice signal, and wherein the distributing means operates according to the control information to selectively distribute at least one of the initial voice signals and the modified voice signal to the effector means.

10. A method of accompanying a vocal performance with a karaoke accompaniment reproduced according to karaoke data, comprising the steps of:

separately converting a plurality of singing voices vocalized by different singers into respective ones of initial voice signals;

providing a plurality of pitch shifters, each pitch shifter being utilized to shift a pitch of the initial voice signal to create a modified voice signal representative of a harmony voice made consonant to the singing voice corresponding to the initial voice signal;

selectively distributing the initial voice signals to the pitch shifter according to control information contained in the karaoke data so as to create the modified voice signals corresponding to the distributed initial voice signals, wherein one initial voice signal is distributed to one group of pitch shifters and other initial voice signals are distributed to other groups of pitch shifters, respectively, so that the singing voices of the different singers are treated independently from each other; and selectively mixing the initial voice signals and the modified voice signals so as to reproduce the vocal performance composed of selected ones of the singing voices and the harmony voices in synchronization with the karaoke accompaniment.

11. A method according to claim 10, wherein the step of selectively distributing comprises memorizing the karaoke data containing the control information arranged according to progression of the karaoke accompaniment in a memory, sequentially retrieving the control information from the memory in synchronization with progression of the karaoke accompaniment, and selectively distributing the initial voice signals to the pitch shifter according to the retrieved control information in matching with the progression of the karaoke accompaniment.

12. A method according to claim 10, wherein the step of selectively distributing comprises distributing one initial voice signal to one pitch shifter and distributing another initial voice signal to another pitch shifter so that the singing voices of the different singers are treated independently from each other to create harmony voices separately made consonant to corresponding ones of the singing voices.

13. A machine readable media containing instructions for causing a karaoke machine accompanying a vocal performance with a karaoke accompaniment reproduced according to karaoke data to perform chorus operation comprising the steps of:

separately converting a plurality of singing voices vocalized by different singers into respective ones of initial voice signals;

activating a plurality of pitch shifters, each pitch shifter being utilized to shift a pitch of the initial voice signal to create a modified voice signal representative of a harmony voice made consonant to the singing voice corresponding to the initial voice signal;

selectively distributing the initial voice signals to the pitch shifter according to control information contained in the karaoke data so as to create the modified voice signals corresponding to the distributed initial voice signals, wherein one initial voice signal is distributed to one group of pitch shifters and other initial voice signals are distributed to other groups of pitch shifters, respectively, so that the singing voices of the different singers are treated independently from each other; and selectively mixing the initial voice signals and the modified voice signals so as to reproduce the vocal performance composed of selected ones of the singing voices and the harmony voices in synchronization with the karaoke accompaniment.

14. A machine readable media according to claim 13, wherein the step of selectively distributing comprises memorizing the karaoke data containing the control information arranged according to progression of the karaoke accompaniment in a memory, sequentially retrieving the control information from the memory in synchronization with progression of the karaoke accompaniment, and selectively distributing the initial voice signals to the pitch shifter according to the retrieved control information in matching with the progression of the karaoke accompaniment.

15. A machine readable media according to claim 13, wherein the step of selectively distributing comprises distributing one initial voice signal to one pitch shifter and distributing another initial voice signal to another pitch shifter so that the singing voices of the different singers are treated independently from each other to create harmony voices separately made consonant to corresponding ones of the singing voices.

16. A karaoke apparatus for accompanying a vocal performance with a karaoke accompaniment reproduced according to karaoke data, comprising:

an input device that separately converts a plurality of singing voices vocalized by different singers into respective ones of initial voice signals;

at least one pitch shifter that is utilized to shift a pitch of the initial voice signal to create a modified voice signal representative of a harmony voice made consonant to the singing voice;

a distributor that operates according to control information contained in the karaoke data to selectively distribute the initial voice signals to the pitch shifter so as to create the modified voice signal corresponding to the distributed initial voice signal, wherein the distributor distributes the initial voice signals to the pitch shifter in a time-varying manner in matching with the time-sequential progression of the karaoke accompaniment; and an output device that selectively mixes the initial voice signals and the modified voice signal to reproduce the vocal performance composed of selected ones of the singing voices and the harmony voice in synchronization with the karaoke accompaniment.

17. A karaoke apparatus according to claim 16, wherein the distributor comprises a memory that memorizes the karaoke data containing the control information arranged according to progression of the karaoke accompaniment, a sequencer that sequentially retrieves the control information from the memory in synchronization with progression of the karaoke accompaniment, and a selector that operates according to the retrieved control information to selectively distribute the initial voice signals to the pitch shifter in matching with the progression of the karaoke accompaniment.

18. A karaoke apparatus according to claim 16, wherein the distributor distributes one initial voice signal to one pitch shifter and distributes another initial voice signal to another pitch shifter so that the singing voices of different singers are treated independently from each other to create harmony voices that are separately made consonant to corresponding ones of the singing voices.

19. A karaoke apparatus according to claim 16, wherein the distributor distributes only one of the initial voice signals to a plurality of pitch shifter so as to create a plurality of harmony voices variably made consonant to one of the singing voices while other initial voice signals are distributed without going through the pitch shifters.

20. A karaoke apparatus according to claim 16, further comprising at least one effector that is utilized to impart an acoustic effect to the initial voice signals and the modified voice signal, and wherein the distributor operates according to the control information to selectively distribute at least one of the initial voice signals and the modified voice signal to the effector.

21. A karaoke apparatus for accompanying a vocal performance with a karaoke accompaniment reproduced according to karaoke data, comprising:

an input device that separately converts a plurality of singing voices vocalized by different singers into respective ones of initial voice signals;

a plurality of pitch shifters, each pitch shifter being utilized to shift a pitch of the initial voice signal to create a modified voice signal representative of a harmony voice made consonant to the singing voice corresponding to the initial voice signal;

a distributor that operates according to control information contained in the karaoke data to selectively distribute the initial voice signals to the pitch shifters so as to create the modified voice signals corresponding to the distributed initial voice signals, wherein the distributor distributes selected initial voice signals to groups of pitch shifters, respectively, to create a plurality of harmony voices variably made consonant to the singing voices corresponding to the selected initial voice signals while other initial voice signals are distributed without going through the pitch shifters; and an output device that selectively mixes the initial voice signals and the modified voice signals to reproduce the vocal performance composed of selected ones of the singing voices and the harmony voices in synchronization with the karaoke accompaniment.

22. A karaoke apparatus according to claim 21, wherein the distributor comprises a memory that memorizes the karaoke data containing the control information arranged according to progression of the karaoke accompaniment, a sequencer that sequentially retrieves the control information from the memory in synchronization with progression of the karaoke accompaniment, and a selector that operates according to the retrieved control information to selectively distribute the initial voice signals to the pitch shifter in matching with the progression of the karaoke accompaniment.

23. A karaoke apparatus according to claim 21, wherein the distributor distributes only one of the initial voice signals to a plurality of pitch shifter so as to create a plurality of harmony voices variably made consonant to one of the singing voices while another initial voice signal is distributed without going through the pitch shifters.

24. A karaoke apparatus according to claim 21, further comprising at least one effector that is utilized to impart an acoustic effect to the initial voice signals and the modified voice signal, and wherein the distributor operates according to the control information to selectively distribute at least one of the initial voice signals and the modified voice signal to the effector.

25. A method of accompanying a vocal performance with a karaoke accompaniment reproduced according to karaoke data, comprising the steps of:

separately converting a plurality of singing voices vocalized by different singers into respective ones of initial voice signals;

providing a plurality of pitch shifters, each pitch shifter being utilized to shift a pitch of the initial voice signal to create a modified voice signal representative of a harmony voice made consonant to the singing voice corresponding to the initial voice signal;

selectively distributing the initial voice signals to the pitch shifters to control information contained in the karaoke data so as to create the modified voice signals corresponding to the distributed initial voice signals, wherein the distributor distributes selected initial voice signals to groups of pitch shifters, respectively, to create a plurality of harmony voices variably made consonant to the singing voices corresponding to the selected initial voice signals while other initial voice signals are distributed without going through the pitch shifters; and selectively mixing the initial voice signals and the modified voice signals so as to reproduce the vocal performance composed of selected ones of the singing voices and the harmony voices in synchronization with the karaoke accompaniment.

26. A method according to claim 25, wherein the step of selectively distributing comprises memorizing the karaoke data containing the control information arranged according to progression of the karaoke accompaniment in a memory, sequentially retrieving the control information from the memory in synchronization with progression of the karaoke accompaniment, and selectively distributing the initial voice signals to the pitch shifter according to the retrieved control information in matching with the progression of the karaoke accompaniment.

* * * * *